Patented Sept. 2, 1947

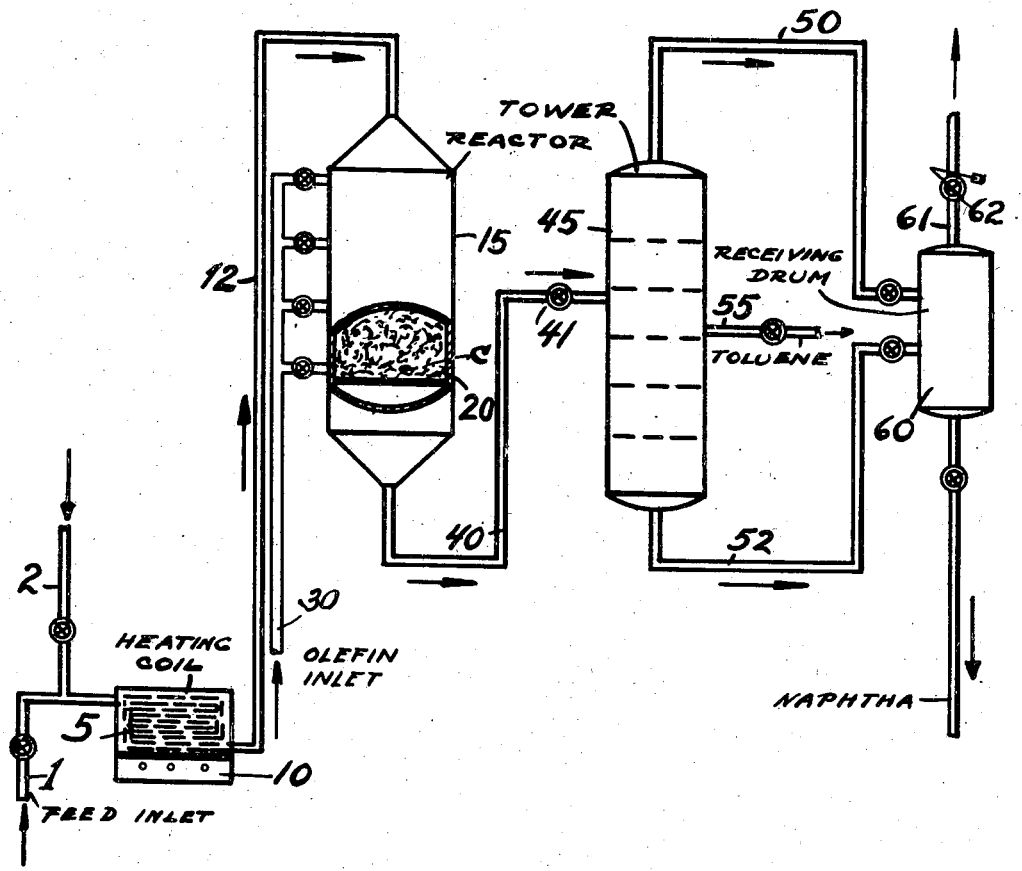

2,426,870

UNITED STATES PATENT OFFICE 2,426,870

PROCESS FOR SIMULTANEOUSLY DEHYDROGENATING NAPHTHENES AND HYDROGENATING OLEFINS

Ralph M. Hill, Mountainside, N. J., assignor to Standard Oil Development Company, a corporation of Delaware Application September 26, 1942, Serial No. 459,750

3 Claims. (Cl. 260—668)

The present invention relates to improvements in the manufacture of hydrocarbons and, more particularly, it relates to a combined dehydrogenation-hydrogenation process carried out in the presence of a dehydrogenation catalyst whereby cyclic naphthenic compounds may be converted to aromatics and hydrogen thus liberated is employed to saturate olefins. Thus, a specific aspect of my invention involves the dehydrogenation of methylcyclohexane to yield toluene and the hydrogenation with the hydrogen thereby released of diisobutylene to form a branch chain paraffin boiling within the gasoline range.

Dehydrogenation of a cyclic paraffin, such as methylcyclohexane, to yield toluene is a highly endothermic reaction and ordinarily where this dehydrogenation is carried out in a vertical cylindrical reactor, the temperature gradient from the top to bottom of the reactor may be considerable, amounting in some instances to 90° F. or more. Obviously this is a highly undesirable situation.

I have provided in my present invention means for alleviating this temperature gradient in dehydrogenation operations carried out in elongated dehydrogenation zones by leading into the zone at spaced points a quantity of olefin which is hydrogenated by the hydrogen liberated in the dehydrogenation reaction. The hydrogenation of the olefin being exothermic compensates for the heat absorbed in the dehydrogenation, and by adjusting the quantity of olefin hydrogenated with respect to the paraffin dehydrogenated, I am enabled to neutralize virtually, the temperature gradients within the reaction zone, or at least restrict them within reasonable limits.

One object of my present invention is to so operate the dehydrogenation of cyclic paraffins or other paraffins as to prevent inordinate temperature gradients within the confines of the reaction zone.

Another object of my invention involves the catalytic dehydrogenation of a paraffinic hydrocarbon in the presence of a suitable dehydrogenation catalyst coupled with the hydrogenation of an olefin whereby I am enabled to control temperature conditions within the reaction zone and secure as valuable by-products aromatic and isoparaffinic hydrocarbons.

Another important object of my invention is to produce toluene of nitratable grade from methylcyclohexane in a continuous operation in which the temperature conditions prevailing in the reaction zone are controlled by introducing into said zone quantities of olefinic hydrocarbons which are hydrogenated and by virtue of the hydrogenation release sufficient heat to overcome temperature drops normally occasioned by the dehydrogenation reaction.

Other and further objects of my invention will appear from the following more detailed description and claims.

In the accompanying drawing, I have illustrated diagrammatically apparatus in which my invention may be successfully performed.

I shall now set forth a specific example illustrating my invention and in so doing I shall refer to the drawing, but it is to be understood that the specific details I am about to enumerate are purely illustrative and do not impose any limitation on the inventive concept contained in my invention.

Referring in detail to the drawing, a mixed feed stock containing naphthenic hydrocarbons, predominantly methylcyclohexane, and a catalytically cracked heavy naphtha, is discharged into line 1 and thence discharged into a coil 5 disposed in a furnace 10 where the mixture is heated to a temperature of about 1000° F. and thence withdrawn through line 12 and discharged into the top of reactor 15 containing catalyst C disposed on a foraminous support 20. The reactor, however, may be of the upflow type, that is to say, the vapors may flow upwardly through the catalyst. The catalyst may be an equal molecular mixture of nickel and tungsten sulfides, it may be chromium oxide supported on activated alumina; for instance, it may have a composition of from 20–40% by weight of chromia and from 60–80% by weight of activated alumina, or it may consist of 5–10% by weight of molybdenum oxide supported on 90–95% activated alumina. Any well known or efficient dehydrogenation and hydrogenation catalysts may be employed, although those mentioned above are preferred. The catalyst is usually in the form of lumps, pills, extruded lengths, granules and the like.

It is preferable to add extraneous hydrogen, at least at the start of operations, through line 2, but this may be discontinued shortly after the reaction commences.

The temperature prevailing within the reactor is maintained at about 900°–1100° F., and the pressure may be from atmospheric to 400 lbs. or thereabouts. The feed rate is preferably 0.5 to 2 volumes of cold feed per volume of reaction per hour. Under the conditions specified, a naphthene such as the methylcyclohexane undergoes dehydrogenation to form toluene, and the hydrogen thus liberated hydrogenates the olefins of the cracked stock with the result that the opposing heats of reaction are substantially negative to each other and the temperature gradient from top to bottom is substantially zero. In order to realize this condition, the feed stock must be carefully proportioned as to naphthenes and olefins so that sufficient heat is liberated by the hydrogenation of the olefins to compensate for the heat absorbed by the dehydrogenation of the naphthenes. Of course, the amount of cracked stock that must be mixed with the paraffins to cause the dehydrogenation of the naphthenes to proceed in the reaction in such a manner that the heat absorbed by the dehydrogenation is negatived by the heat released by the hydrogenation of the olefins will depend on the amount of dehydrogenatable paraffins present. It may be said that 3 volumes of pure olefin release sufficient heat during saturation by means of hydrogen which is approximately equivalent to the heat lost by dehydrogenating 1 volume of a naphthene such as methylcyclohexane. Consequently, for each volume of naphthenes fed into the dehydrogenation zone, three volumes of mono-olefins should also be fed to the zone to act as hydrogen acceptors and to supply the heat necessary to maintain the desired temperature conditions.

The products are taken off overhead from reactor 15 through line 40 carrying a pressure reducing valve 41 and discharged into fractionator 45. The desired toluene fraction is recovered from fractionating column 45 as a side stream through line 55 and this fraction may be solvent extracted, distilled, acid treated and redistilled in known manner, in equipment not shown, to produce a nitratable grade of toluene. The fraction recovered through line 52 may be discharged into a receiving drum 60. The product in receiving drum 60 is suitable for use as a high grade blending agent in the production of an automotive fuel of good octane number.

The vent pipe 61 carries a pressure reducing valve 62 and, if desired, a portion of the gas withdrawn through line 61 may be recycled to reactor 15 since it will normally be rich in hydrogen and the period during which the catalyst may be operated without requiring regeneration will be prolonged by recycling hydrogen in the manner indicated. Also, the presence of hydrogen both extraneous and that formed in situ tends to prevent carbonaceous deposits on the catalyst and the catalyst may therefore be used continuously for 500–1000 hours or more by recycling hydrogen from receiving drum 60 or some other suitable point in the system to reaction vessel 15. The quantity of added hydrogen recycled may vary from 10–80 mol per cent, or perhaps better expressed as 2000–4000 cubic feet of hydrogen per barrel of oil fed to the system.

Of course, there may and undoubtedly will come a time when it will be necessary to interrupt the reaction taking place in 15 in order to regenerate the catalyst. This may be accomplished in known manner by treating the fouled catalyst with heated air or other oxygen-containing gaseous mixtures under known conditions of temperature and pressure to burn off the contaminants and restore the activity of the catalyst.

I have described hereinbefore a method of producing toluene from the corresponding cycloparaffin. It will be understood that I may produce any aromatics or employ similar procedures, namely, carry out dehydrogenation in the presence of olefins which act as hydrogen acceptors and are themselves hydrogenated to yield saturated products, the purpose being to supply heat in this manner to compensate for the heat absorbed during the dehydrogenation, and it is the principal purpose of this invention to so proportion the hydrogenation of the olefins that they will liberate sufficient heat to make the system internally compensating with the net result that the heat of reaction and the temperature gradient from one end of the reaction zone to the other is virtually nil. It may be preferable in certain processes to introduce the olefin into reactor 15 at spaced points as through an olefin feed inlet line 30 rather than to introduce the entire quantity at the top or bottom; but, in any event, it is important in this invention to accurately proportion the olefins so that they will supply and liberate in the reaction zone during their hydrogenation a quantity of heat which will compensate for the heat absorbed during the dehydrogenation.

Many modifications of my invention will readily suggest themselves to those who are familiar with this art.

What I claim is:

1. In the process of catalytically dehydrogenating a cycloparaffin in an elongated reaction zone to form an aromatic compound, the improved steps which comprise preheating the cycloparaffin with admixed hydrogen to a temperature in the range of 900° to 1100° F., passing the cycloparaffin together with the admixed hydrogen thus preheated into one end of the reaction zone to flow lengthwise therethrough in contact with a metal oxide dehydrogenation catalyst, supplying an olefin accurately proportioned in sufficient amount at a plurality of points spaced along the reaction zone to accurately balance heat evolved by hydrogenation of said olefin with heat absorbed by dehydrogenation of said cycloparaffin and thereby maintain a substantially uniform reaction temperature within the limits of 900° to 1100° F. throughout the reaction zone, and maintaining a pressure of from 1 atmosphere to 400 lbs./sq. in. in the reaction zone.

2. In the process of catalytically dehydrogenating naphthenes in a hydrocarbon feed stock containing predominantly methylcyclohexane mixed with a cracked heavy naphtha feed stock containing olefins, the improved steps which comprise heating the feed stocks to a temperature of about 1000° F., passing the thus heated feed stocks into an elongated reaction zone to pass lengthwise therethrough in contact with a mixed metal compound dehydrogenation and hydrogenation catalyst, for a period at least at the start of the reaction admixing and preheating hydrogen with the feed stocks in a proportion of 10 to 80 mol per cent, maintaining a pressure of 1 atmosphere to 400 lbs./sq. in. in the reaction zone, supplying at a plurality of points spaced along the reaction zone sufficient olefins accurately proportioned to balance heat consumption of dehydrogenation with heat released by dehydrogenation thereby to maintain a uniform temperature within the limits of 900° to 1100° F. throughout the reaction zone, and removing from the reaction zone a vapor product containing toluene with gas rich in hydrogen.

3. In the process of catalytically dehydrogenating methylcyclohexane to toluene, the improved steps which comprise heating methylcyclohexane with admixed hydrogen to about 1000° F., charging the thus heated mixture into one end of an elongated reaction zone to flow lengthwise therethrough in contact with a mixed activated alumina and molybdenum oxide catalyst containing a major proportion of the alumina, simultaneously charging to the reaction zone at spaced points along its length up to approximately three volumes of diisobutylene in accurately adjusted quantities per volume of methylcyclohexane charge to substantially balance exothermic heat of hydrogenation with endothermic heat of dehydrogenation and thereby maintain a uniform reaction temperature within the limits of 900° to 1100° F. throughout the reaction zone, and maintaining a pressure of from 1 atmosphere to 400 lbs./sq. in. in the reaction zone, the admixed hydrogen being from 10 to 80 mol per cent of charge to the reaction zone.

RALPH M. HILL.

REFERENCES CITED

The following references are of record in the file of this patent:

UNITED STATES PATENTS

| Number | Name | Date |
|---|---|---|
| 2,241,393 | Danner | May 13, 1941 |
| 2,284,468 | Burk et al | May 26, 1942 |
| 2,232,736 | Schulze | Feb. 25, 1941 |
| 1,808,168 | Hopkins | June 22, 1931 |
| 2,303,075 | Frey | Nov. 24, 1942 |
| 2,283,859 | Friedman et al | May 19, 1942 |

FOREIGN PATENTS

| Number | Country | Date |
|---|---|---|
| 423,001 | Great Britain | Jan. 23, 1935 |

OTHER REFERENCES

Levina, J. Gen. Chem. (U. S. S. R.) 6, 1496-9 (1936); C. A. 31 2173-4. (Copy of C. A. in 260-676.)